(12) United States Patent
Sasaki et al.

(10) Patent No.: US 10,549,353 B2
(45) Date of Patent: Feb. 4, 2020

(54) CUTTING TOOL

(71) Applicant: TUNGALOY CORPORATION, Fukushima (JP)

(72) Inventors: Ryota Sasaki, Iwaki (JP); Satoru Yoshida, Iwaki (JP); Tomoha Tabe, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 15/966,309

(22) Filed: Apr. 30, 2018

(65) Prior Publication Data

US 2018/0326504 A1 Nov. 15, 2018

(30) Foreign Application Priority Data

May 10, 2017 (JP) .................................. 2017-093785
Mar. 14, 2018 (JP) .................................. 2018-046210

(51) Int. Cl.
*B23C 5/24* (2006.01)
*B23B 27/16* (2006.01)
*B23B 29/034* (2006.01)

(52) U.S. Cl.
CPC .... *B23B 29/0341* (2013.01); *B23B 29/03492* (2013.01); *B23C 5/241* (2013.01); *B23C 5/2475* (2013.01); *B23B 2205/045* (2013.01)

(58) Field of Classification Search
CPC ....... Y10T 82/12; Y10T 82/125; B23B 29/03; B23B 29/034; B23B 29/03432; B23B 29/03446; B23B 29/0345; B23B 29/03457; B23B 29/0346; B23B 29/03417; B23B 29/03421
See application file for complete search history.

(56) References Cited

U.S. PATENT DOCUMENTS 1,444,481 A 2/1923 Rotat
2,805,468 A * 9/1957 Williams .............. B23C 5/2455
407/41
3,189,976 A * 6/1965 Pickril .............. B23B 29/03417
407/76

(Continued)

FOREIGN PATENT DOCUMENTS

DE 381543 C 9/1923
DE 848 893 C 9/1952

(Continued)

OTHER PUBLICATIONS

JP-2007136633-A Machine Translation, pp. 4-8 (Year: 2019).*

*Primary Examiner* — Nicole N Ramos
(74) *Attorney, Agent, or Firm* — Studebaker & Brackett PC

(57) ABSTRACT

An object of the present invention is to provide a cutting tool capable of expanding a range in which adjustment work can be readily performed and reducing manufacturing cost. Provided is a cutting tool including: a cartridge to which a cutting member having a cutting edge is fixed; a body having at least one cartridge mounting part in which the cartridge is installed; and an adjustment plate installed between walls or a bottom surface constituting the cartridge mounting part and the cartridge, wherein the walls or the bottom surface of the cartridge mounting part has a recessed part for housing the adjustment plate.

16 Claims, 7 Drawing Sheets

(56) References Cited

U.S. PATENT DOCUMENTS

| | | | | |
|---|---|---|---|---|
| 3,755,868 | A | * | 9/1973 | LaForge ............ B23B 29/03417 407/75 |
| 4,530,263 | A | | 7/1985 | Muentel |
| 4,848,977 | A | * | 7/1989 | Kieninger ............... B23C 5/207 407/39 |
| 5,209,610 | A | * | 5/1993 | Arai ........................ B23C 5/241 407/36 |
| 5,529,439 | A | * | 6/1996 | Werner ................... B23C 5/241 407/39 |
| 5,735,649 | A | | 4/1998 | Boscarino et al. |
| 6,695,548 | B2 | * | 2/2004 | Focken ................... B23C 5/241 407/34 |
| 8,066,455 | B2 | * | 11/2011 | Neumann ............. B23B 31/008 409/234 |
| 8,511,942 | B2 | * | 8/2013 | Kretzschmann ............................. B23B 29/03417 407/36 |
| 8,978,526 | B2 | * | 3/2015 | Nedzlek ................... B23C 5/08 407/75 |
| 2005/0019118 | A1 | * | 1/2005 | Elbaz ...................... B23B 27/04 408/186 |
| 2010/0303569 | A1 | | 12/2010 | Gonen et al. |

FOREIGN PATENT DOCUMENTS

| | | | |
|---|---|---|---|
| DE | 38 28 746 C1 | | 7/1989 |
| JP | S56-102411 A | | 8/1981 |
| JP | S57-153413 U | | 9/1982 |
| JP | H10-146705 A | | 6/1998 |
| JP | 2007136633 A | * 6/2007 | ............... B23C 5/06 |
| JP | 2009-125828 A | | 6/2009 |

* cited by examiner

CUTTING TOOL

BACKGROUND

Field

The present invention relates to a cutting tool and, particularly, to a cutting tool which uses a cartridge for fixing a cutting member.

Description of Related Art

As disclosed in Patent Publication JP-A-2009-125828, conventionally, in a cutting tool in a mode which uses a cartridge, a plate-like member may be used for adjusting a position of the cartridge with respect to a radial direction of the tool. Specifically, a boring bar disclosed in Patent Publication JP-A-2009-125828 is provided with a tool body on which a seat groove is formed, and a tapered shim for adjustment and a tool cartridge are installed in the seat groove. An end surface of the tapered shim that comes into contact with the tool cartridge has a tapered shape, and when the tapered shim is pulled toward a base end side of the tool by an adjustment bolt installed on the base end side of the tool relative to the tapered shim, the tapered end surface pushes the tool cartridge in a radial direction of the tool. Accordingly, a position of the tool cartridge with respect to the radial direction of the tool is adjusted.

SUMMARY

In the case of the cutting tool disclosed in Patent Publication JP-A-2009-125828, since a mechanism is provided in which the position of the tool cartridge is adjusted by rotating the adjustment bolt to move the tapered shim, an angle of the taper must be kept small to enable fine adjustment. However, in such a case, adjusting the position of the tool cartridge by a large amount requires operating the adjustment bolt many times to move the tapered shim by a large distance. In other words, the cutting tool disclosed in Patent Publication JP-A-2009-125828 has a problem in that an adjustment range in which adjustment work can be readily performed is considerably limited.

There is another problem in that the shape of the tapered shim being complex and the need to machine, in a tool body, a screw hole in which the adjustment bolt is to be inserted are likely to increase a manufacturing cost of the cutting tool according to Patent Publication JP-A-2009-125828.

Another conceivable method for position adjustment involves sandwiching a plurality of thin plates between the cartridge and the body to adjust the position of the cartridge in a radial direction of the tool. In this case, fine adjustment can be realized by changing the number of thin plates.

However, a machining experiment conducted by the inventors of the present application using the method described above revealed that, as machining progressed, a part of the thin plates became displaced and, in some cases, became dislodged. Since a displacement or a dislodgement of a thin plate causes a position or an angle of the tool cartridge to deviate, position adjustment must be performed once again.

The present invention has been developed in order to solve the problems described above. Specifically, an object of the present invention is to provide a cutting tool which includes a position adjustment mechanism capable of expanding a range in which adjustment work can be readily performed, reducing manufacturing cost, and supporting a tool cartridge in a stable manner during machining.

A cutting tool according to a first invention includes: a cartridge to which a cutting member having a cutting edge is fixed; a body having at least one cartridge mounting part in which the cartridge is installed; and an adjustment plate installed between a wall or a bottom surface constituting the cartridge mounting part and the cartridge, wherein the wall or the bottom surface of the cartridge mounting part has a recessed part for housing the adjustment plate.

In the cutting tool according to the present invention, preferably, a size of the recessed part is larger than a side surface of the cartridge that faces the recessed part.

In addition, preferably, a wall or a bottom surface on which a recessed part is not formed in the cartridge mounting part includes a flat surface parallel to a straight line which connects the cutting edge and a rotational axis of the body with each other and which defines a radial rake, and the cartridge is fixed by the flat surface. Furthermore, preferably, the straight line and the bottom surface of the recessed part are perpendicular to each other.

Preferably, in the cutting tool according to the present invention, the cartridge includes a through hole into which a fastener for fixing the cartridge to the cartridge mounting part is inserted, the through hole is formed so as to extend toward the bottom surface of the cartridge mounting part, a mounting hole into which the fastener inserted into the through hole is inserted is formed on the bottom surface of the cartridge mounting part, and when viewed in a direction parallel to central axes of the through hole and the mounting hole, a diameter of the through hole is larger than a diameter of the mounting hole in a direction in which the cartridge is moved by the adjustment plate.

In the cutting tool according to the present invention, preferably, an area of the adjustment plate is larger than an area of the side surface of the cartridge that faces the adjustment plate.

In the cutting tool according to the present invention, preferably, a depth of the recessed part formed in the cartridge mounting part is equal to or greater than half of a thickness of the adjustment plate.

Furthermore, the cutting tool according to the present invention includes the following aspect. Specifically, the cutting tool includes: a cartridge for fixing a cutting member having a cutting edge; and a body for fixing the cartridge, wherein the cutting tool performs cutting with the cutting edge by rotating the body around a rotational axis. In addition, the body includes a cartridge holding part provided with a first flat surface part having a first flat surface which is parallel to the rotational axis, a second flat surface part having a second flat surface which intersects the rotational axis, and a third flat surface part having a third flat surface which intersects the first flat surface and the second flat surface and on which a female screw is formed, the cartridge includes, when fixed to the body, a fourth flat surface part having a fourth flat surface which is parallel to the first flat surface, a fifth flat surface part having a fifth flat surface which is parallel to the second flat surface, and a sixth flat surface part having a sixth flat surface which is parallel to the third flat surface and on which is formed a through hole to be penetrated by a male screw that screws with the female screw, the first flat surface is provided in a recessed part formed in the first flat surface part, and the cartridge is configured to be fixed to the body via an adjustment plate having a major surface which is parallel to the first flat surface and the fourth flat surface in a gap between the first flat surface and the fourth flat surface. Furthermore, preferably, the through hole is formed as an elongated hole which is long in a normal direction of the fourth flat surface.

In this case, preferably, the second flat surface is parallel to a straight line which connects the cutting edge and the rotational axis of the body with each other and which defines a radial rake. Furthermore, preferably, the straight line and the first flat surface are perpendicular to each other.

DETAILED DESCRIPTION

Figure 1:
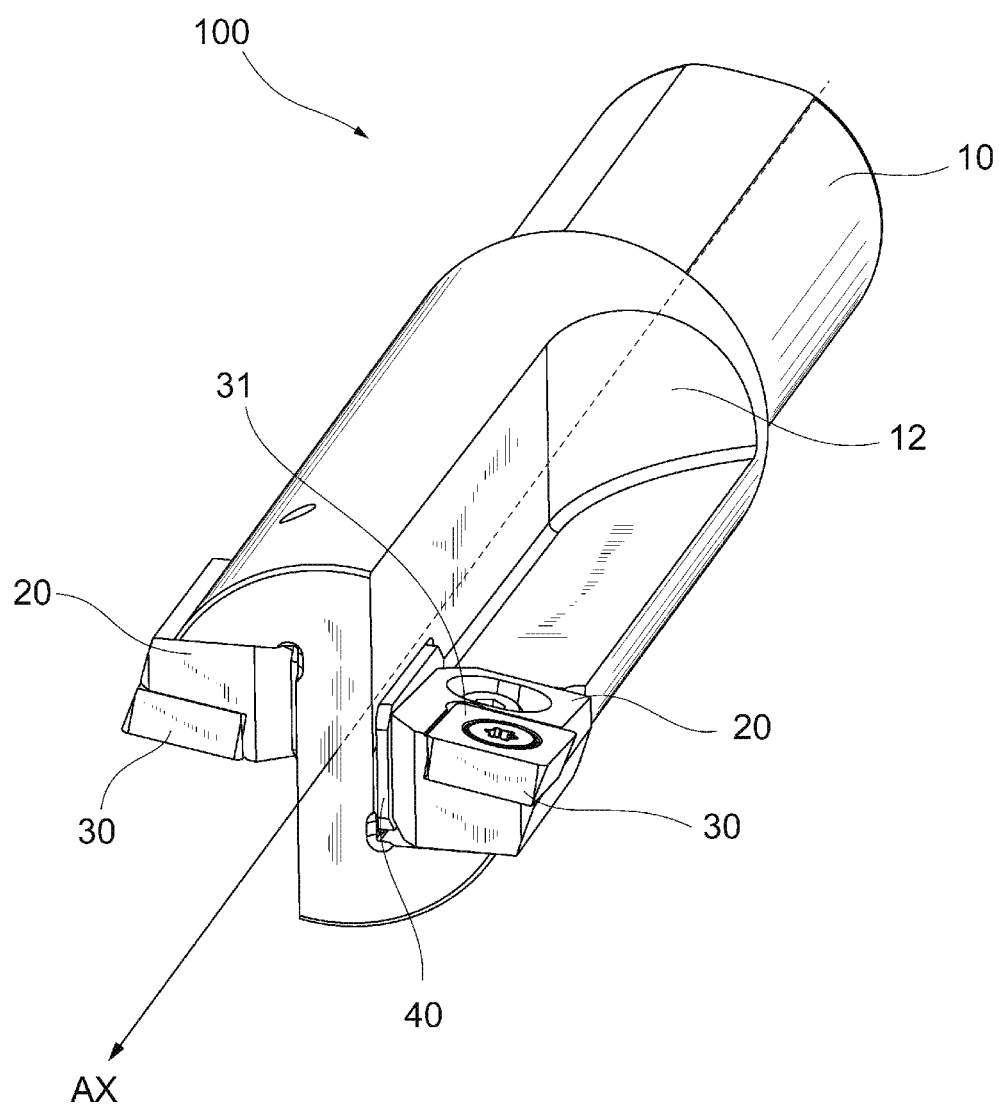
FIG. 1 is a perspective view of a cutting tool according to an embodiment of the present invention.
Figure 2:
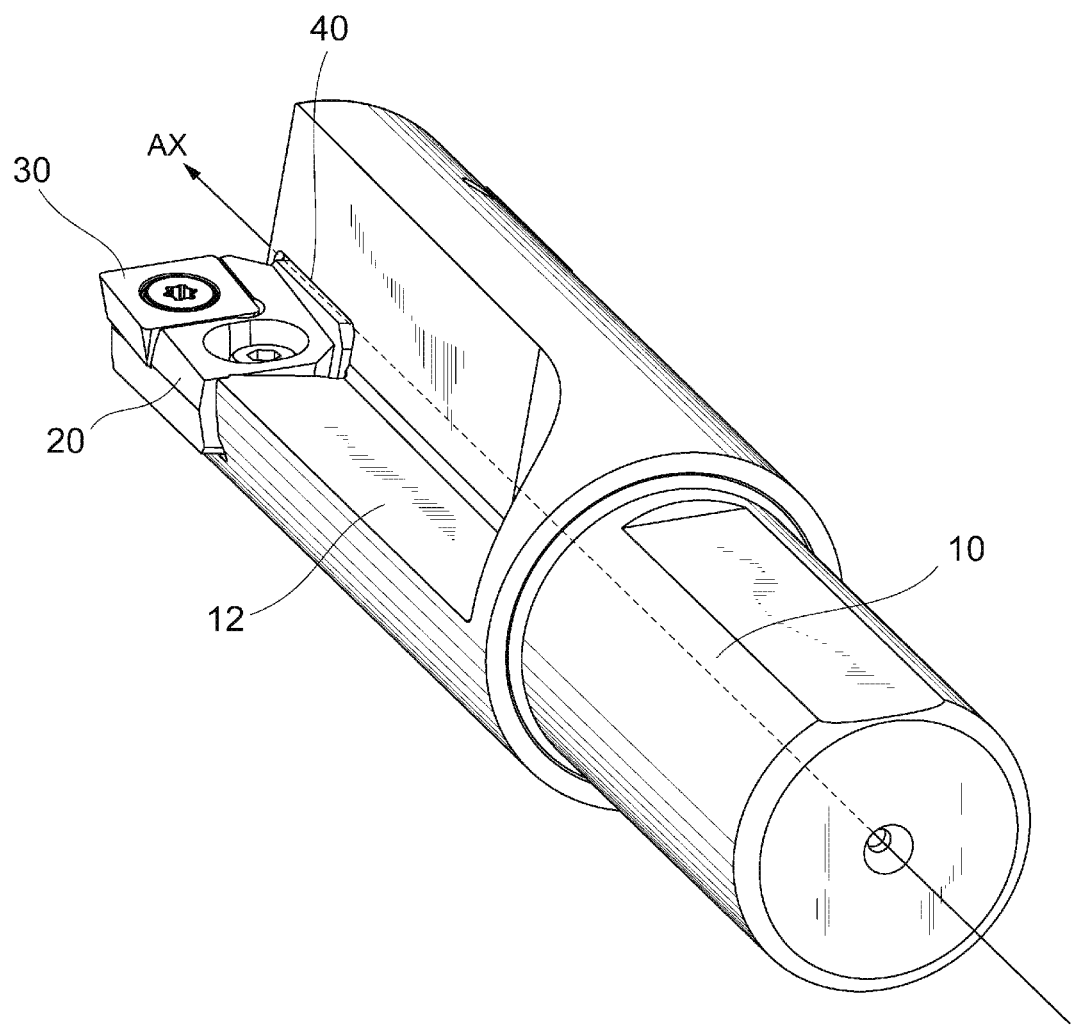
FIG. 2 is a perspective view of the cutting tool shown in FIG. 1 when viewed from a different angle.
Figure 3:
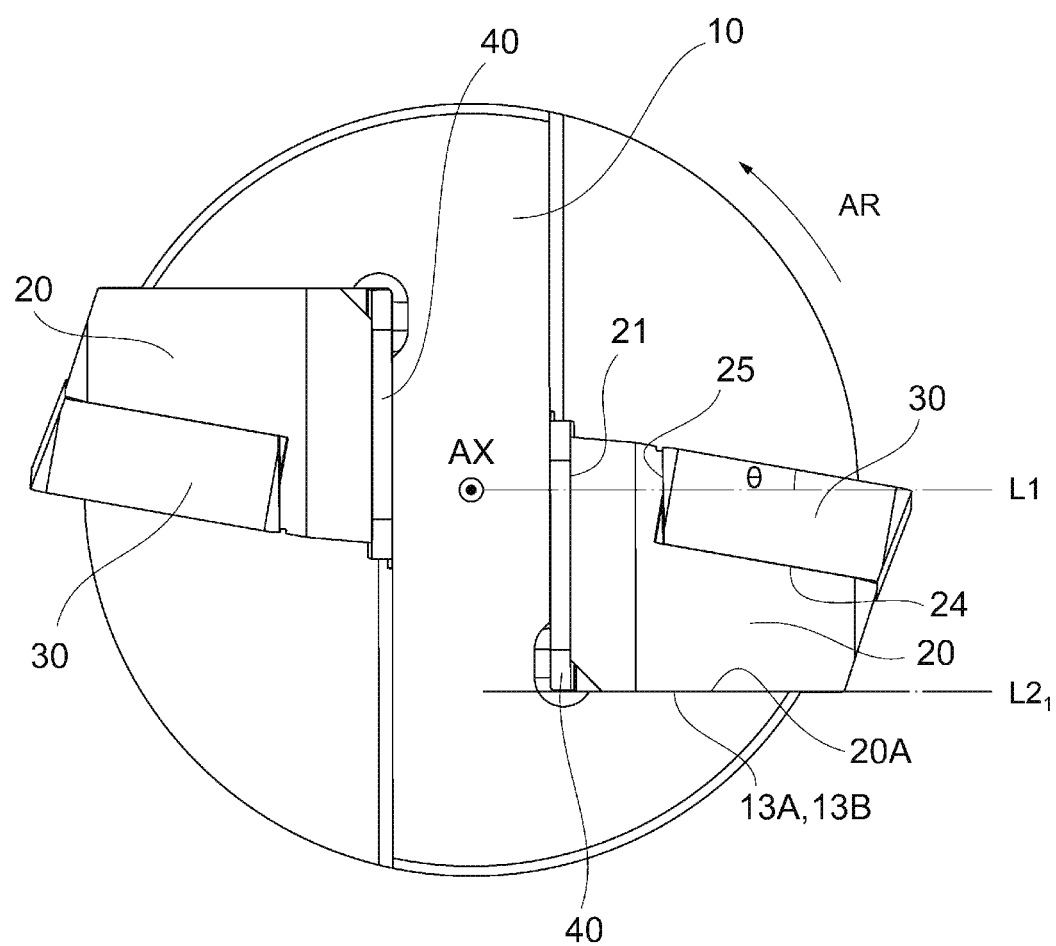
FIG. 3 is a diagram of the cutting tool shown in FIG. 1 in a leading end view.
Figure 4:
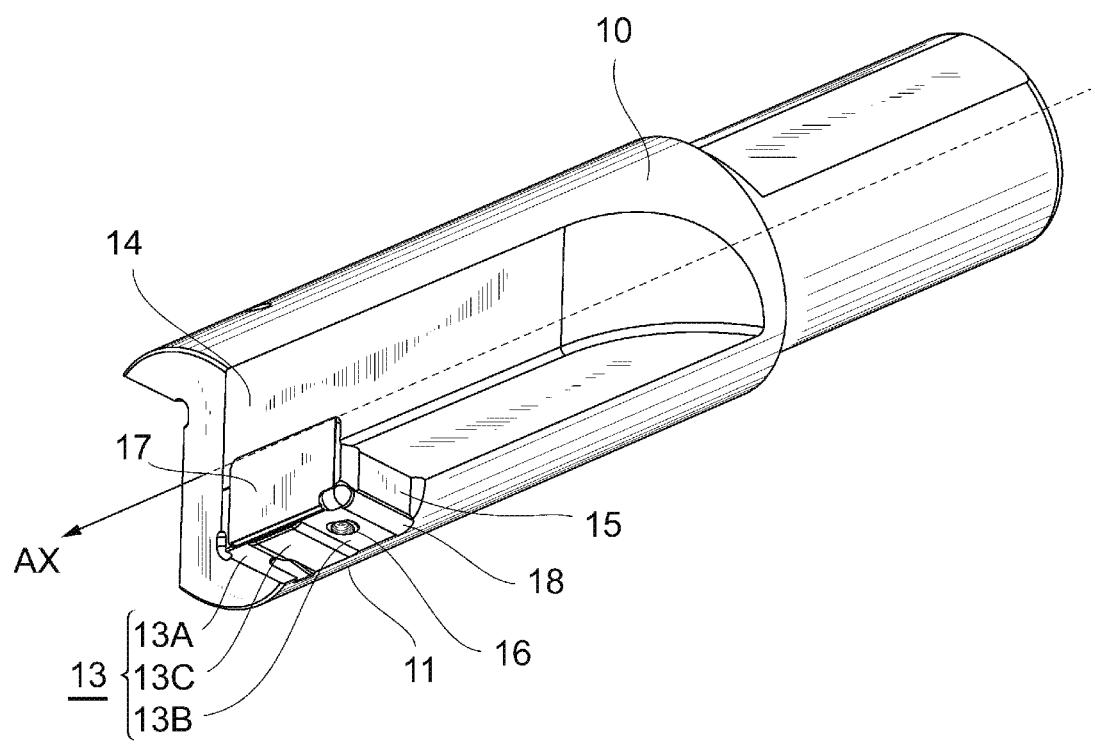
FIG. 4 is a perspective view of a body of a cutting tool according to the present embodiment.
Figure 5:
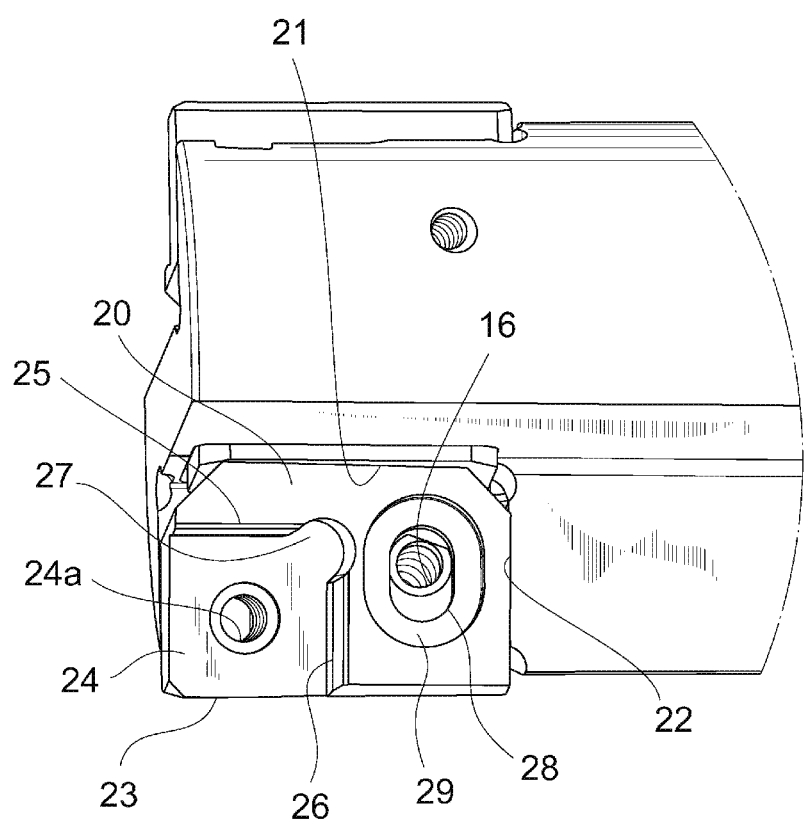
FIG. 5 is a diagram showing an enlargement of a leading end part of a cutting tool according to the present embodiment.
Figure 6A:
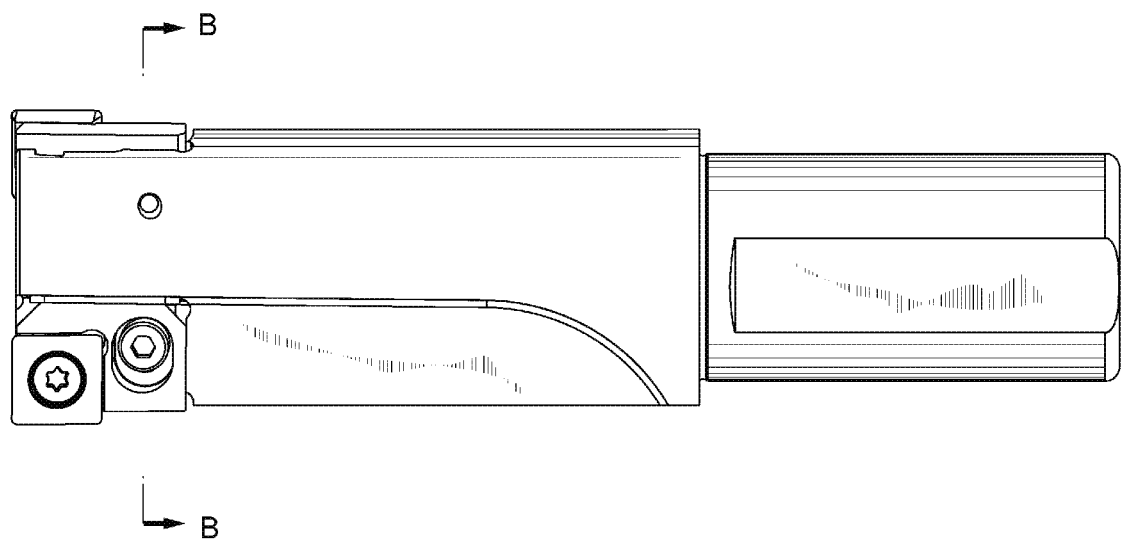
FIGS. 6A and 6B are respectively a plan view and a sectional view of the present embodiment.
Figure 6B:
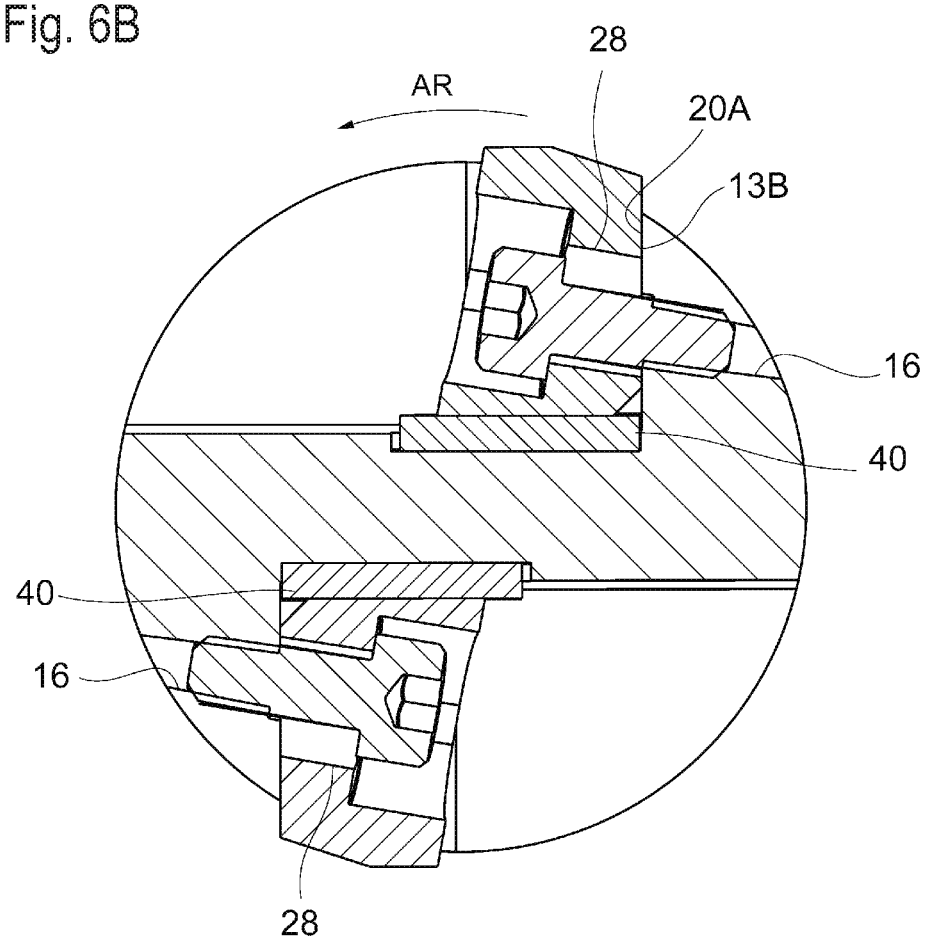

Hereinafter, an embodiment of the present invention will be described with reference to the drawings. FIG. 1 is a perspective view of a cutting tool according to the present embodiment. FIG. 2 is a perspective view of the cutting tool according to the present embodiment when viewed from a different angle. FIG. 3 is a diagram of the cutting tool according to the present embodiment in a leading end view or, in other words, the cutting tool according to the present embodiment as viewed in a direction parallel to a central axis of a body. FIG. 4 is a perspective view of the body according to the present embodiment. FIG. 5 is a diagram showing an enlargement of a leading end part of the cutting tool according to the present embodiment as viewed parallel to a central axis of a through hole formed in a cartridge. Note that, in FIG. 5, screws for fixing a cutting insert and a cartridge have been omitted. FIG. 6A is a plan view of the cutting tool according to the present embodiment, and FIG. 6B is a sectional view taken along b-b in FIG. 6A.

The cutting tool 100 according to the present embodiment shown in FIGS. 1 to 3 is a so-called boring tool for enlarging a diameter of an already machined hole, and is provided with a body 10 having an approximately cylindrical shape, two cartridges 20, and two adjustment plates 40. The cutting tool 100 is capable of cutting a cut material by rotating the body 10 around a central axis AX and, accordingly, rotating a cutting insert 30 respectively fixed and supported by the two cartridges 20 that are fixed to the body 10.

In the present embodiment, the cartridge 20 functions as a seat for fixing the cutting insert 30 that is a cutting member having a cutting edge. In addition, the cartridge 20 also has a function of protecting the body 10 by preventing chips generated when the cutting insert 30 cuts the cut material from colliding with and damaging the body 10. Alternatively, a tool life of the body 10 can be extended by configuring a readily damaged portion as the cartridge 20 to make the portion interchangeable.

As shown in FIG. 3, notched parts are formed in the body 10 so as to be 180-degree rotationally symmetrical with respect to the central axis AX of the body 10 and, as shown in FIG. 4, each of the two notched parts constitutes a cartridge mounting part 11 for mounting the cartridge 20.

A linear chip discharge groove 12 which is oriented from a leading end toward a base end is formed on an outer periphery of the body 10.

Chips created during a cutting process are discharged through the chip discharge groove 12.

In the present embodiment, the adjustment plate 40 has a function of displacing the cartridge 20 in a radial direction of the body 10 to adjust a position of the cartridge 20, and the adjustment plate 40 is installed between a wall 14 constituting the cartridge mounting part 11 and the cartridge 20. For example, the adjustment plate 40 is formed of a substantially rectangular parallelepiped with a plate shape having a prescribed thickness and chamfered corners. The adjustment plate 40 includes one substantially rectangular major surface which comes into contact with the body 10 and another substantially rectangular major surface which is parallel to the one major surface and which comes into contact with the cartridge 20 when the cartridge 20 is mounted to the cartridge mounting part 11. In addition, by preparing, in advance, a plurality of the adjustment plates 40 having a same shape with the exception of thickness and inserting the adjustment plate 40 having a prescribed thickness between the wall 14 and the cartridge 20, positioning of the cartridge 20 as well as a cutting edge of the cutting insert 30 which is fixed by the cartridge 20 can be performed.

As shown in FIG. 4, each cartridge mounting part 11 is constituted by a bottom surface 13 (an example of the "third flat surface part"), the wall 14 (an example of the "first flat surface part") which is formed so as to rise perpendicularly from the bottom surface and which includes a surface oriented in a direction of rotation of the body 10 (a surface of which a normal approximately matches the direction of rotation), and a wall 15 (an example of the "second flat surface part") which is perpendicular to the bottom surface 13 and to the wall 14 and which includes a flat surface oriented in a direction of the central axis AX of the body 10.

As similarly shown in FIG. 4, the bottom surface 13 of the cartridge mounting part 11 includes a flat surface 13B (an example of the "third flat surface") on which is formed a screw hole 16 in which a female screw is threaded, a flat surface 13A which is provided so as to be separated from the flat surface 13B in a direction of the leading end of the body 10 on a same plane including the flat surface 13B, and a recessed part 13C which is provided between the flat surface 13A and the flat surface 13B. The flat surface 13A and the flat surface 13B are respectively perpendicular to a bottom surface (an example of the "first flat surface") of a recessed part 17.

In this case, the screw hole 16 is provided at an acute angle with respect to the flat surface 13B and formed such that, the further inside the body 10 from the flat surface 13B, the shorter the distance between the screw hole 16 and the recessed part 17.

When the cartridge 20 is mounted to the cartridge mounting part 11, a male screw inserted into the cartridge 20 is inserted into the screw hole 16 and screws with the female screw formed in the screw hole 16. In addition, as a head of the male screw comes into contact with the cartridge 20 and pushes the cartridge 20 toward the cartridge mounting part 11, the cartridge 20 is fixed to the cartridge mounting part 11. At this point, a bottom surface 20A of the cartridge 20 (an example of the "sixth flat surface", refer to FIG. 3) comes into contact with both the flat surface 13A and the flat surface 13B. The recessed part 17 is formed on the wall 14 of which a wall surface is oriented in the radial direction of the body 10 among the wall 14 and the wall 15 of the cartridge mounting part 11.

The recessed part 17 is a place for housing the adjustment plate 40, and an external shape thereof is approximately the same as that of the adjustment plate 40. Therefore, when the adjustment plate 40 is housed in the recessed part 17, only a slight gap is formed between the adjustment plate 40 and an inner wall of the recessed part 17.

A size of the recessed part 17 or, in other words, an area of a bottom surface of the recessed part 17 is formed so as to be larger than an area of a side surface 21 (an example of the "fourth flat surface") of the cartridge 20 which opposes the recessed part 17. Therefore, as respectively shown in FIGS. 1 to 3, when inserting the adjustment plate 40 between the cartridge 20 and the recessed part 17, the side surface 21 of the cartridge 20 comes into contact with the adjustment plate 40 but does not come into contact with the wall 14 of the body 10.

A depth of the recessed part 17 is equal to or greater than half of a thickness of the adjustment plate 40, and the drawings of the present embodiment illustrate a case where the depth of the recessed part 17 is approximately 60% of the thickness of the adjustment plate 40. The depth of the recessed part 17 is set so as to be equal to or greater than half of a thickness of a thickest adjustment plate 40 among the plurality of adjustment plates 40 with different thicknesses. In other words, the depth of the recessed part 17 is set so as to be equal to or greater than 50% and less than 100% of a maximum value that is assumed as an amount of positioning in the radial direction (in other words, the thickness of the thickest adjustment plate 40).

The bottom surface of the recessed part 17 is parallel to the central axis AX. Therefore, a normal of the bottom surface of the recessed part 17 is perpendicular to the central axis AX. In addition, four inner wall surfaces which are connected to the bottom surface of the recessed part 17 are respectively perpendicular to the bottom surface of the recessed part 17.

As shown in FIG. 4, the wall 15 includes a wall surface (an example of the "second flat surface") oriented towards the central axis AX. The wall surface is respectively perpendicular to the bottom surface of the recessed part 17 as well as the flat surface 13A and the flat surface 13B. In addition, as shown in FIG. 5, when the cartridge 20 is fixed to the cartridge mounting part 11, a side surface 22 (an example of the "fifth flat surface") of the cartridge 20 comes into contact with a wall surface of the wall 15.

As shown in FIG. 4, a recess 18 is formed at connecting locations between the bottom surface 13 of the cartridge mounting part and the walls 14 and 15. By forming the recess 18, a corner of the cartridge 20 enters the recess 18 when the cartridge 20 is installed in the cartridge mounting part 11 and, consequently, the side surfaces 21 and 22 of the cartridge 20, the adjustment plate 40, and the wall 15 of the cartridge mounting part reliably come into contact with each other.

As shown in FIG. 5, a notched part formed on the leading end of the cartridge 20 becomes an insert seat 23 on which the cutting insert 30 is to be installed and fixed.

The insert seat 23 is constituted by a bottom surface 24 and two walls 25 and 26 which rise from the bottom surface 24.

Respective virtual extension surfaces of the two walls 25 and 26 of the insert seat 23 are nearly orthogonal to each other and are formed so that the cutting insert 30 with a square shape may be appropriately installed. Recessed parts 27 are formed at locations corresponding to connecting parts of the two walls 25 and 26. By forming the recess part 27, a corner of the cutting insert 30 enters the recess part 27 when the cutting insert 30 is installed on the insert seat 23 and, consequently, side surfaces of the cutting insert 30 reliably come into contact with the walls 25 and 26 of the insert seat.

When the cutting insert 30 is a so-called positive insert, the bottom surface 24 of the insert seat 23 intersects with the wall 25 and the wall 26 at an obtuse angle. In addition, as shown in FIG. 3 which is a leading end view of the cutting tool 100 seen in a direction of the leading end of the central axis AX, an inclination is imparted such that, the further away from the central axis AX, the shorter the distance between the bottom surface 24 and the bottom surface 20A. Therefore, when the cutting insert 30 is installed on the insert seat 23, a radial rake θ defined by a straight line L1 and a rake surface can be set to a negative value, the straight line L1 connecting a leading end part in the direction of the central axis AX of a cutting edge provided on an outer peripheral side of the cutting insert 30 and the central axis AX at a shortest distance and the rake surface being oriented in a direction of rotation AR of the cutting insert 30. When the radial rake θ is set to a negative value, chips curl in a direction of separation from the wall 14 of the cutting tool 100. The chips are more readily discharged so as to be pushed outward in the radial direction by a rotation of the cutting tool 100. As a result, retention of chips in a region enclosed by the wall 14, the rake surface of the cutting insert 30, and a wall surface of the chip discharge groove 12 can be suppressed and discharging efficiency of chips can be improved.

Furthermore, in a leading end view of the cutting tool 100 according to the present embodiment from a direction of the leading end of the central axis AX, the straight line L1 which defines the radial rake θ with the rake surface of the cutting insert 30 and a straight line L2 included in the flat surface 13A and the flat surface 13B of the cartridge mounting part 11 of the body 10 which comes into contact with the bottom surface 20A of the cartridge 20 are parallel to each other (in other words, the straight line L1 and the flat surfaces 13A and 13B are parallel to each other). In addition, the straight line L1 and the straight line L2 are perpendicular to the bottom surface of the recessed part 17. An effect obtained by establishing such a relationship will be described later.

As shown in FIG. 5, a through hole 28 into which a male screw for fixing is to be inserted is formed on the cartridge 20. A counterbore 29 is formed in the through hole 28, and a head of a male screw inserted into the through hole 28 is to be positioned deeper than a surface of the cartridge 20.

As shown in FIGS. 6A and 6B, when the cartridge 20 is fixed to the cartridge mounting part 11, a central axis (a line connecting a center in a cross section) of the through hole 28 which communicates with the screw hole 16 extends obliquely with respect to the bottom surface 20A of the cartridge 20 and to the flat surface 13B of the bottom surface 13 of the cartridge mounting part which comes into contact with the bottom surface 20A, such that, the closer to the bottom surface 20A, the shorter the distance between the central axis and the adjustment plate 40. Therefore, when the cartridge 20 is installed in the cartridge mounting part 11, the male screw inserted into the through hole 28 generates a force which pushes the cartridge 20 against the bottom surface 13 of the cartridge mounting part 11 and a force which pushes the cartridge 20 toward the walls 14 and 15 of the cartridge mounting part 11. As a result, in addition to the bottom surface 20A, the side surface 21 and the side surface 22 are also rigidly fixed to the cartridge mounting part 11.

The through hole 28 has an elongated hole shape and is larger than a diameter of the screw hole 16 formed in the cartridge mounting part 11, and is configured as an oblong hole which is elongated in a thickness direction of the adjustment plate 40 (in other words, a normal direction of the bottom surface of the recessed part 17) so that the cartridge 20 can be fixed by a screw even if the insertion of the adjustment plate 40 causes the cartridge 20 to move in the radial direction of the body 10. Specifically, as shown in FIG. 5 which is a view in a direction parallel to a central axis of the through hole 28, a diameter of the through hole 28 or, in other words, a width of the oblong hole is larger than a diameter of the screw hole 16. Furthermore, a dimension of the oblong hole in a direction in which the cartridge 20 is moved by the adjustment plate 40 or, in other words, the distance between centers of two semicircles provided at both ends of the oblong hole is greater than a thickness of the thickest adjustment plate 40.

A screw hole 24a in which a female screw is threaded is formed on the bottom surface 24 of the insert seat, and the cutting insert 30 is fixed to the insert seat 23 as a screw inserted into a through hole 31 formed on the cutting insert 30 enters the screw hole 24a.

Next, operations and effects of the cutting tool 100 according to the present embodiment will be described. As shown in FIG. 3, since the adjustment plate 40 is sandwiched between the cartridge mounting part 11 and the cartridge 20 and, at the same time, the bottom surface of the recessed part 17 in which the adjustment plate 40 is installed is parallel to the central axis AX, the cartridge 20 moves in the radial direction of the cutting tool 100 by a same length as a thickness of the adjustment plate 40 which is housed in the recessed part 17. Accordingly, while the cutting insert 30 fixed to the cartridge 20 also moves in the radial direction, since the straight line L1 which defines the radial rake of the cutting insert 30 and the straight like L2 included in the flat surface 13A or the flat surface 13B which comes into contact with the cartridge 20 are parallel to each other, a negative radial rake θ can be kept constant even when the thickness of the adjustment plate 40 changes.

In particular, since the screw hole 16 is provided on the flat surface 13B which defines the straight line L2, parallelism between the flat surface 13B and the bottom surface 20A which comes into contact with the flat surface 13A being flush with the flat surface 13B can be maintained at a high level. Therefore, even when a position in a radial direction changes, a variation of the radial rake θ can be suppressed. In addition, by providing the recessed part 13C which does not come into contact with the bottom surface 20A between the two flat surfaces 13A and 13B, since a biased contact between the bottom surface 20A and the bottom surface 13 can be suppressed, a contribution can be made toward suppressing a variation of the radial rake θ.

At the same time, since an axial center of the screw hole 16 is formed such that, the further inside the body 10 from the flat surface 13B, the shorter the distance between the axial center and the recessed part 17, the adjustment plate 40 and the side surface 21 which comes into contact with the adjustment plate 40 are also rigidly fixed. As a result, an angle of the two bottom surfaces 20A and the side surface 21 which affect a variation of the radial rake θ can be kept constant regardless of the thickness of the adjustment plate 40.

In other words, by preparing adjustment plates 40 with various thicknesses in advance, positions of the cartridge 20 and the cutting insert 30 in the radial direction can be adjusted while maintaining the radial rake θ by simply interchangeably using the adjustment plate 40 with a desired thickness. In addition, since a difference in thicknesses of the adjustment plates 40 is reflected as-is as a displacement in the radial direction, position adjustment work can be conducted in an expeditious manner.

Figure 7A:
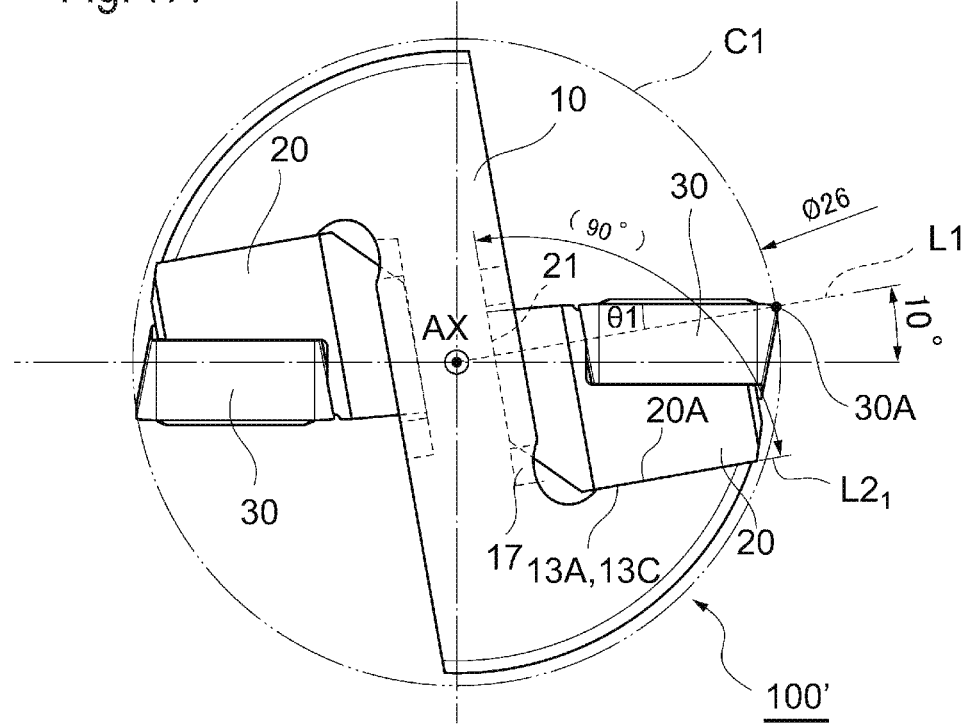
FIGS. 7A and 7B are diagrams of a cutting tool according to an embodiment of the present invention in a leading end view.
Figure 7B:
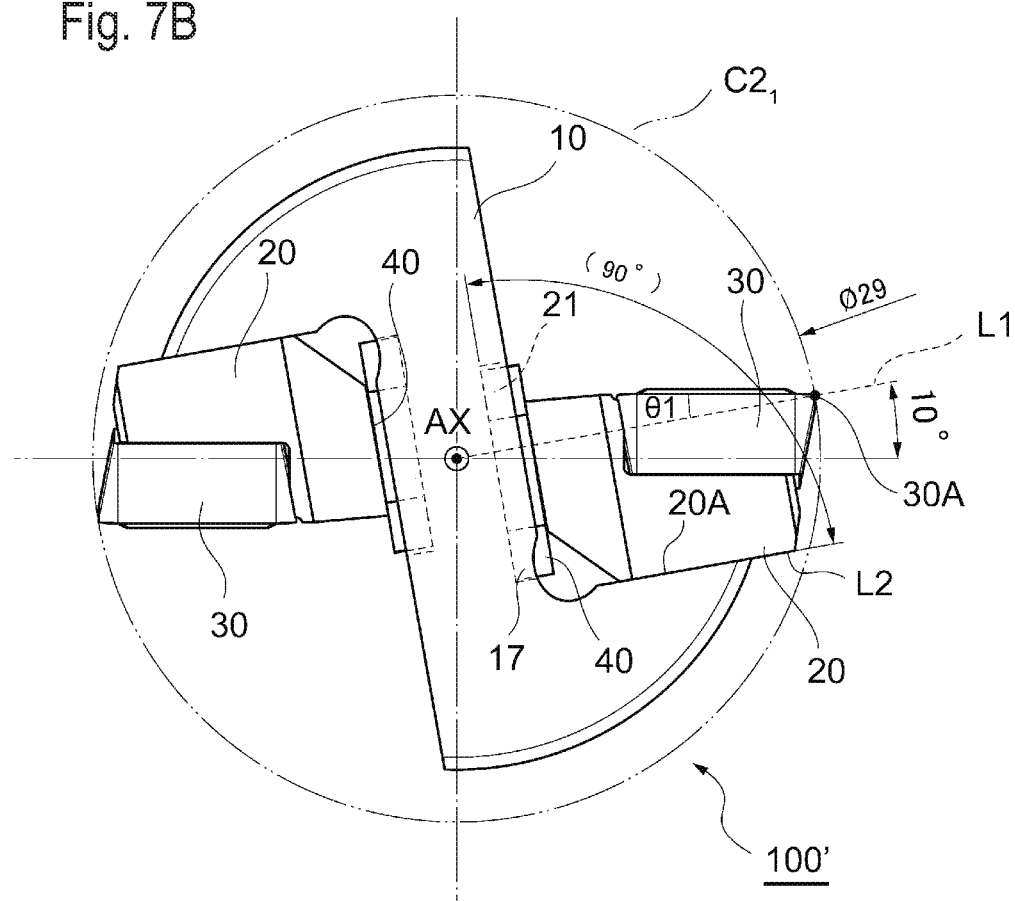

FIGS. 7A and 7B are leading end views seen in the direction of the central axis AX of a cutting tool 100' similar to the cutting tool 100 according to the present embodiment, which show that the radial rake θ is constant in a case where the adjustment plate 40 is not used (FIG. 7A) and in a case where the adjustment plate 40 is used (FIG. 7B). Note that components providing similar functions as the components of the cutting tool 100 will be denoted by same reference signs and a description thereof will be omitted even if dimensions thereof differ from those of the components of the cutting tool 100.

FIG. 7A shows a case where the cartridge 20 is directly mounted to the body 10 without using the adjustment plate 40. In this case, the bottom surface of the recessed part 17 provided on the wall 14 of the cartridge mounting part 11 comes into contact with the side surface 21 of the cartridge 20, and the flat surface 13A and the flat surface 13B of the bottom surface 13 come into contact with the bottom surface 20A of the cartridge 20. In addition, the bottom surface of the recessed part 17 is perpendicular to the flat surface 13A and the flat surface 13B.

As shown in FIG. 7A, in a leading end view, a rotational trajectory of a point 30A which corresponds to an end in the radial direction in the cutting edge of the cutting insert 30 corresponds to a circle C1 which is centered on the central axis AX and which has a diameter of 26 mm. In addition, in a leading end view, the straight line L1 which connects the point 30A and the central axis AX with each other and the straight line L2 on the flat surface 13A and the flat surface 13B are parallel to each other. Furthermore, the negative radial rake θ defined by the straight line L1 and a rake surface in a vicinity of the point 30A of the cutting insert 30 is 10 degrees.

FIG. 7B shows a case where the cartridge 20 is mounted to the body 10 using the adjustment plate 40 having a thickness of 1.5 mm and of which the two major surfaces are parallel to each other. In this case, the bottom surface of the recessed part 17 provided on the wall 14 of the cartridge mounting part 11 comes into contact with one major surface of the adjustment plate 40, and the side surface 21 of the cartridge 20 comes into contact with the other major surface of the adjustment plate 40. In addition, the flat surface 13A and the flat surface 13B of the bottom surface 13 come into contact with the bottom surface 20A of the cartridge 20.

As shown in FIG. 7B, in a leading end view, a rotational trajectory of the point 30A which corresponds to an end in the radial direction in the cutting edge of the cutting insert 30 corresponds to a circle C2 which is centered on the central axis AX and which has a diameter of 29 mm. In addition, since the straight line L1 is perpendicular to the bottom surface of the recessed part 17 as well as the major surfaces of the adjustment plate 40 and, at the same time, the straight line L2 is parallel to the straight line L1, it is shown that the negative radial rake θ is maintained at 10 degrees even when the adjustment plate 40 is inserted.

Furthermore, since all that is required is to form the recessed part 17 on the wall 14 of a cartridge mounting part with an ordinary shape, a manufacturing cost of the body 10 can be kept low. Although the cutting insert 30 which is susceptible to damage due to cutting, chips, and the like generally has a higher replacement frequency than the cartridge 20, by providing the adjustment plate 40 between the cartridge 20 and the body 10 instead of between the cutting insert 30 and the cartridge 20, the time required to perform position adjustment in the radial direction when replacing the cutting insert 30 can be reduced.

In addition, the size of the major surface of the adjustment plate 40 is larger than the size of the side surface 21 of the cartridge 20 which comes into contact with the major surface, and an entirety of the side surface 21 of the cartridge 20 comes into contact with the adjustment plate 40 when fixing the cartridge 20. Therefore, high stability is achieved.

In a similar manner, since the size of the bottom surface of the recessed part 17 is also larger than the size of the side surface 21 of the cartridge 20, even when the cartridge 20 is fixed to the cartridge mounting part 11 without using the adjustment plate 40, the entire side surface of the cartridge 20 comes into contact with the bottom surface of the recessed part 17. As a result, the cartridge 20 is fixed in a stable manner.

Since half or more of the adjustment plate 40 is housed inside the recessed part 17 as in a case where the depth of the recessed part 17 is approximately 60% of the thickness of the adjustment plate 40, even when a situation arises where the cartridge mounting part 11 deflects due to cutting resistance during machining and causes a gap to be formed between the adjustment plate 40 and the cartridge 20, the inner wall of the recessed part 17 serves as a stopper which prevents the adjustment plate 40 from becoming dislodged.

In other words, by housing half or more of the adjustment plate 40 inside the recessed part 17, a range of cutting conditions which enable a state where the adjustment plate 40 is stably mounted to be maintained can be expanded as compared to a case where the adjustment plate 40 is simply sandwiched between the cartridge 20 and the wall 14 of the cartridge mounting part 11.

Although the present invention has been described taking an embodiment thereof as an example, it is to be understood that the present invention is not limited to the embodiment described above and that various modifications may be made thereto.

For example, the recessed part 17 for housing the adjustment plate 40 may not only be formed on the wall 14 of which a wall surface is oriented in the radial direction as in the embodiment described above, but may also be formed on the wall 15 of which a wall surface is oriented toward the leading end of the body 10. In this case, the position of the cartridge 20 can be adjusted in a direction of the central axis of the body 10. In other words, no particular limitations apply to a wall on which the recessed part 17 is to be formed, and the recessed part 17 can be formed on wall on an opposite side to a direction in which the cartridge 20 is to be moved.

In a similar manner, the recessed part 17 may also be provided on the bottom surface 13 of the cartridge mounting part 11. In this case, the position of the cartridge 20 can be adjusted in a direction approximately perpendicular to the bottom surface 13 of the cartridge mounting part 11.

A cutting member to be fixed by the cartridge 20 is not limited to a removable cutting insert, and a mode in which a cutting member is completely fixed by brazing or the like may be adopted. In other words, it does not matter whether the cutting member is removable with respect to the cartridge 20 or not.

In addition to the boring tool described above, the cutting tool according to the present invention can also be applied to a wide variety of cutting tools including a turning tool, other milling tools such as a face mill and a side cutter, and a drilling tool.

What is claimed is:

1. A cutting tool, comprising:
a body having a cartridge mounting part, the cartridge mounting part including a wall or a bottom surface;
a recessed part formed on the wall or the bottom surface of the cartridge mounting part;
a cartridge positioned on the cartridge mounting part;
a first hole formed in the cartridge mounting part;
a second hole extending entirely through the cartridge to be in communication with the first hole;
a cutting member having a cutting edge fixed to the cartridge;
and
an adjustment plate installed in the recessed part such that the wall or the bottom surface constituting the cartridge mounting part is on a first side of the adjustment plate, and both the first hole and the second hole are on a second, opposite side of the adjustment plate from the first side.

2. The cutting tool according to claim 1, wherein
the cutting tool is a rotary cutting tool which cuts a cut material with the cutting edge of the cutting member by rotating the body, and
the bottom surface of the cartridge mounting part includes a flat surface which is parallel to a straight line connecting the cutting edge and a rotational axis of the body with each other and the flat surface comes into contact with the cartridge in a leading end view seen from the rotational axis of the body.

3. The cutting tool according to claim 1, wherein length and width dimensions of the recessed part are larger than corresponding length and width dimensions of a side surface of the cartridge that faces the recessed part.

4. The cutting tool according to claim 1, wherein
a fastener for fixing the cartridge to the cartridge mounting part is inserted through the second hole,
the second hole is formed so as to extend toward the bottom surface of the cartridge mounting part,
the first hole is formed on the bottom surface of the cartridge mounting part, and
when viewed in a direction parallel to central axes of the second hole and the first hole, a diameter of the second hole is larger than a diameter of the first hole.

5. The cutting tool according to claim 1, wherein an area of the adjustment plate is larger than an area of the side surface of the cartridge that faces the adjustment plate.

6. The cutting tool according to claim 1, wherein a depth of the recessed part is equal to or greater than half of a thickness of the adjustment plate.

7. A cutting tool, comprising:
a cartridge for fixing a cutting member having a cutting edge; and
a body for fixing the cartridge,
the cutting tool cutting a cut material with the cutting edge by rotating the body around a rotational axis, wherein
the body includes a cartridge holding part provided with a first flat surface part having a first flat surface which is parallel to the rotational axis, a second flat surface part having a second flat surface which intersects the rotational axis, and a third flat surface part having a third flat surface which intersects the first flat surface and the second flat surface and on which a hole including female screw threads is formed,
the cartridge includes, when fixed to the body, a fourth flat surface part having a fourth flat surface which is parallel to the first flat surface, a fifth flat surface part having a fifth flat surface which is parallel to the second flat surface, and a sixth flat surface part having a sixth flat surface which is parallel to the third flat surface and on which is formed a through hole to be penetrated by a male screw that screws with the female screw threads, the first flat surface is provided in a recessed part formed in the first flat surface part, the cartridge is configured to be fixable to the body via an adjustment plate having a major surface which is parallel to the first flat surface and the fourth flat surface in a gap between the first flat surface and the fourth flat surface, and the through hole is formed as an elongated hole which is long in a normal direction of the fourth flat surface.

8. The cutting tool according to claim 7, wherein the second flat surface is parallel to a straight line which connects the cutting edge and the rotational axis with each other in a leading end view of the cutting tool seen in a direction parallel to a central axis of the rotational axis.

9. The cutting tool according to claim 7, wherein the first flat surface and the second flat surface are perpendicular to each other.

10. The cutting tool according to claim 7, wherein a central axis of the female screw threads is angled such that a distance between the central axis and the recessed part decreases with an increase in a length of the female screw threads from the third flat surface.

11. A cutting tool, comprising:
a body having a cartridge mounting part, the cartridge mounting part including a wall or a bottom surface;
a recessed part formed on the wall or the bottom surface of the cartridge mounting part;
a cartridge positioned on the cartridge mounting part;
a cutting member having a cutting edge fixed to the cartridge;
an adjustment plate installed in the recessed part between the wall or the bottom surface constituting the cartridge mounting part and the cartridge; and
a fastener extending through the cartridge and into the cartridge mounting part, the fastener positioned entirely on one side of the adjustment plate and spaced away from the adjustment plate along an entire length of the fastener.

12. The cutting tool according to claim 11, wherein
the cutting tool is a rotary cutting tool which cuts a cut material with the cutting edge of the cutting member by rotating the body, and
the bottom surface of the cartridge mounting part includes a flat surface which is parallel to a straight line connecting the cutting edge and a rotational axis of the body with each other and the flat surface comes into contact with the cartridge in a leading end view seen from the rotational axis of the body.

13. The cutting tool according to claim 11, wherein length and width dimensions of the recessed part are larger than corresponding length and width dimensions of a side surface of the cartridge that faces the recessed part.

14. The cutting tool according to claim 11, wherein
a fastener for fixing the cartridge to the cartridge mounting part is inserted through the second hole,
the second hole is formed so as to extend toward the bottom surface of the cartridge mounting part,
the first hole is formed on the bottom surface of the cartridge mounting part, and
when viewed in a direction parallel to central axes of the second hole and the first hole, a diameter of the second hole is larger than a diameter of the first hole.

15. The cutting tool according to claim 11, wherein an area of the adjustment plate is larger than an area of the side surface of the cartridge that faces the adjustment plate.

16. The cutting tool according to claim 11, wherein a depth of the recessed part is equal to or greater than half of a thickness of the adjustment plate.

\* \* \* \* \*